United States Patent
Lundvall et al.

(10) Patent No.: US 9,375,911 B2
(45) Date of Patent: Jun. 28, 2016

(54) PRINTING TOOL FOR PRODUCTION OF SYNTHETIC IMAGE DEVICES AND A METHOD OF MANUFACTURING SUCH A TOOL

(71) Applicant: ROLLING OPTICS AB, Stockholm (SE)

(72) Inventors: Axel Lundvall, Bjursås (SE); Robert Eklund, Österskär (SE)

(73) Assignee: Rolling Optics AB, Stockholm (SE)

( * ) Notice: Subject to any disclaimer, the term of this patent is extended or adjusted under 35 U.S.C. 154(b) by 0 days.

(21) Appl. No.: 14/440,695

(22) PCT Filed: Nov. 6, 2013

(86) PCT No.: PCT/SE2013/051301
§ 371 (c)(1),
(2) Date: May 5, 2015

(87) PCT Pub. No.: WO2014/074059
PCT Pub. Date: May 15, 2014

(65) Prior Publication Data
US 2015/0290922 A1   Oct. 15, 2015

(30) Foreign Application Priority Data
Nov. 6, 2012  (SE) .................................. 1251256

(51) Int. Cl.
*B41F 13/10*   (2006.01)
*B41F 3/36*   (2006.01)
(Continued)

(52) U.S. Cl.
CPC ............ *B41F 3/36* (2013.01); *B29D 11/00365* (2013.01); *B44B 5/0009* (2013.01); *G02B 3/0012* (2013.01); *B29C 33/424* (2013.01); *B29C 59/04* (2013.01); *B41C 1/182* (2013.01)

(58) Field of Classification Search
CPC ...................................................... G02B 3/0012
USPC ........................................................ 101/375
See application file for complete search history.

(56) References Cited

U.S. PATENT DOCUMENTS 3,241,429 A * 3/1966 Leach .............. B29D 11/00278
156/242
5,461,495 A * 10/1995 Steenblik .............. B29C 39/026
359/463

(Continued)

FOREIGN PATENT DOCUMENTS

WO  WO 2006/056660 A1  6/2006
WO  WO 2009/085004 A1  7/2009

*Primary Examiner* — Anthony Nguyen
(74) *Attorney, Agent, or Firm* — Birch, Stewart, Kolasch & Birch, LLP

(57) ABSTRACT

A method for manufacturing of a tool for production of synthetic image devices comprises cutting (210) a surface structured plate, giving a respective first and second edge. The plate has geometrical structures—microimages or focusing elements—in a first surface. Cells comprising the geometrical structures have a predetermined period in a first direction. The first edge is brought (212) to face the second edge in a close proximity. The first direction of a first area of the plate adjacent to the first edge is positioned with a predetermined angle with respect to the first direction of a second area of the plate adjacent to the second edge. A relative translation in said same plane between the first edge and the second edge is adapted (214) for bringing a first cell border in the first area to a predetermined distance, relative a corresponding second cell border in the second area. The first and second edges are mutually fixated (216) and mounted (218) onto a cylindrical support. A tool for manufacturing of synthetic image devices is also disclosed.

19 Claims, 9 Drawing Sheets

(51) Int. Cl.
  *B44B 5/00* (2006.01)
  *G02B 3/00* (2006.01)
  *B29D 11/00* (2006.01)
  *B41C 1/18* (2006.01)
  *B29C 33/42* (2006.01)
  *B29C 59/04* (2006.01)

(56) References Cited

U.S. PATENT DOCUMENTS

| | | |
|---|---|---|
| 5,499,580 A | 3/1996 | Hoffmann et al. |
| 6,367,684 B1 | 4/2002 | Hoffmann et al. |
| 7,002,748 B1* | 2/2006 | Conley .................... B41M 3/003 359/619 |
| 2002/0001546 A1* | 1/2002 | Hunter ................. B01F 13/0071 422/82.05 |
| 2002/0094533 A1* | 7/2002 | Hess ..................... B01J 19/0046 435/6.14 |
| 2011/0058239 A1 | 3/2011 | Lundvall et al. |
| 2011/0299160 A1* | 12/2011 | Lundvall ............... G02B 3/0056 359/478 |
| 2012/0140333 A1* | 6/2012 | Tomczyk ......... B29D 11/00278 359/619 |
| 2013/0139714 A1* | 6/2013 | Mehdizadeh ............. G03F 7/18 101/368 |

* cited by examiner

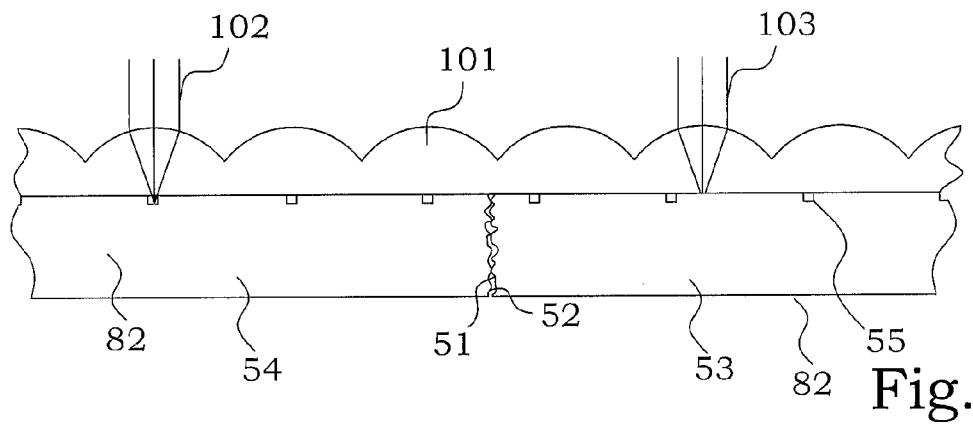
Fig. 9A
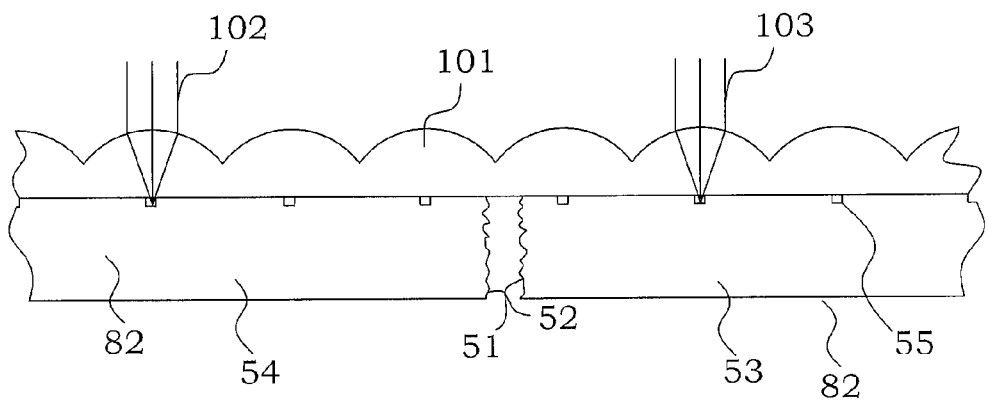
Fig. 9B
Fig. 10
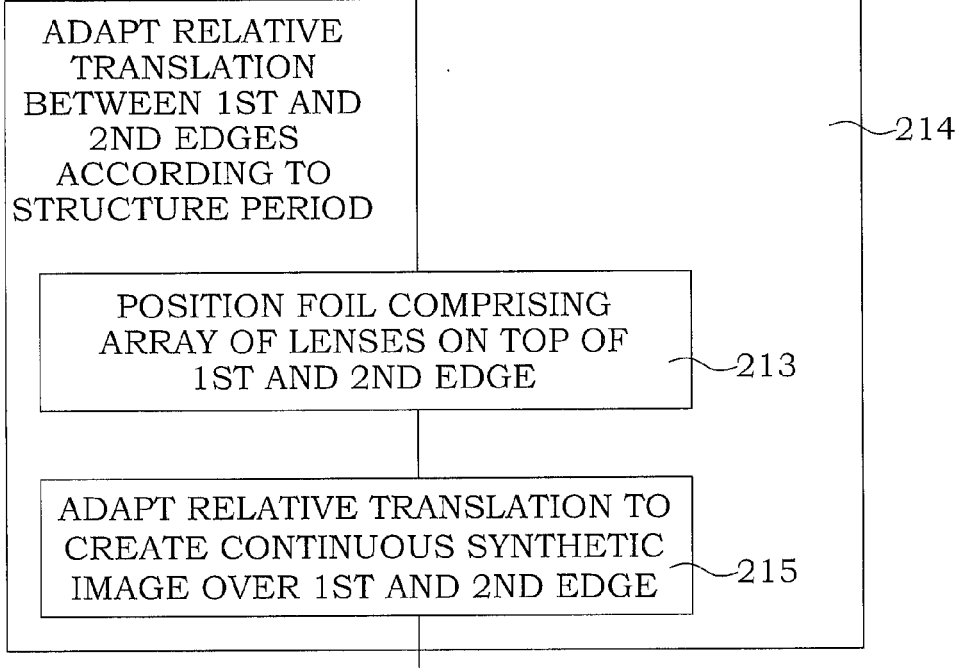

PRINTING TOOL FOR PRODUCTION OF SYNTHETIC IMAGE DEVICES AND A METHOD OF MANUFACTURING SUCH A TOOL

TECHNICAL FIELD

The present invention relates in general to tool for production of synthetic image devices and manufacturing of such tools and in particular to cylindrical such tools and the manufacturing thereof.

BACKGROUND

Synthetic image devices are today used for many different purposes due to their properties of providing eye-catching optical effects. Besides pure esthetical use, synthetic image devices are also frequently used as security label means in e.g. valuable articles, credit cards, identification documents, bank notes etc. In many applications, the synthetic image devices are merged into another material, resulting in a composite product.

Synthetic image devices are based on the interaction between an array of focusing elements and micro image portions. In some prior art "synthetic images" are also referred to as "integral images", since the experienced image is composed of a number of parts interpreted together as an integral unit. The relative geometrical relation gives rise to different optical effects, from different levels of 3D to images that move or change its appearance e.g. dependent on the viewing angle. The focusing elements and the micro image portions are typically provided by printing or embossing on/in an essentially transparent polymer film. To this end, different types of printing/embossing plates are typically used. The synthetic image devices are in prior art sometimes divided into two sub-categories; synthetic integral image devices and moiré magnifiers. In moiré magnifiers, the micro image portion corresponds to scaled-down copies of the intended macro image, provided in a regular array with a period that differs from the period of the focusing elements by only a small fraction. In synthetic integral image devices, each focusing element corresponds to an associated cell of micro images, which typically are designed individually for giving rise to the composite image when viewed through the focusing elements. In other words, a moiré magnifier has a regular array of cells with identical content, but with a different periodicity compared to the array of focusing elements. A synthetic integral image device has a regular array of cells with the same periodicity as of the array of focusing elements, but with differing portions within the cells.

However, adopting the synthetic image device view on micro image definition and applying it to the moiré magnifier results in the understanding that the moiré magnifier is actually a special case of the synthetic image device or integral image device. Using the same period as the focusing elements, the micro image plane can be divided into an array of slightly changing micro images, all showing different parts of a repetitive image pattern sometimes containing parts of more than one image icon.

The synthetic images devices can be produced in sheets, printed and/or embossed one by one using printing/embossing plates. For mass production of synthetic image devices, however, a continuous manufacturing is to prefer. By providing a cylindrical plate, a continuous printing/embossing production can be provided. One example of such a manufacturing method is disclosed in the published international patent application WO 2009/085004 A1.

The cylindrical tools used for the printing/embossing can be provided in different ways. One approach is to produce the plates in a flat form. The useful plate area is cut out and the plate is bent in an essentially cylindrical form by positioning two opposite edges against each other. The edges are then welded together, thereby forming a cylindrical tool. The cylindrical tool is then provided onto a roll and put into a printing/embossing device. One example of providing a cylindrical tool according to such an approach is disclosed in the U.S. Pat. No. 5,499,580.

One problem with such an approach is, however, that the weld seam will be more or less visible in the final product. Such a print or embossment from the weld seam region will appear repeatedly along the final product. For smaller synthetic image devices, areas between such weld seam regions can be cut out and used, and the weld seam regions will be disposed. However, in applications where the synthetic image device is intended to be a part of a continued manufacturing process utilizing continuous web approaches, it is not possible to cut out and dispose the weld seam regions.

An evident weld seam may also cause problems for the manufacturing process itself and result in a lower quality, not only influencing the region around the weld seam, but also other parts of the final product. An evident weld seam also typically results in lower production rates and influences thereby the manufacturing efficiency which eventually results in higher costs.

In the published international patent application WO 2006/056660 A1, it is disclosed to weld the edges from the inside of the cylinder to make the weld seam region appearing at the printing/embossing surface as narrow as possible. The U.S. Pat. No. 6,367,684 B1 discloses a method for smoothing and compacting of a welded joint.

For printing/embossing of most other types of products or images, based on the visual appearance of macroscopic structures, the above presented methods for making the welded joint narrow and "invisible" are typically satisfactory. However, for continuous production of synthetic image devices, a printing/embossing cylinder that has a joint which by direct visual inspection seems to be narrow and smooth, may still give rise to annoying artefacts in the final product.

SUMMARY

An object of the present invention is to provide tools for production of synthetic image devices giving fewer artefacts in a final synthetic image device. A further object of the present invention is to provide tools for facilitating a fast and efficient production of synthetic image devices of high quality. This object is achieved by tools and methods according to the enclosed independent patent claims. Preferred embodiments are defined in dependent patent claims. In general words, in a first aspect, a method for manufacturing of a tool for production of synthetic image devices comprises cutting of at least one surface structured plate, giving a respective first edge and a respective second edge. Each of the at least one surface structured plate has geometrical structures in a first surface. The geometrical structures correspond to microimages or focusing elements intended to be transferred onto an image device. The image device is one of a synthetic integral image device and a moiré magnifier image device. In case of microimages, the microimages giving rise to a synthetic image when they are viewed through an array of focusing elements. In case of focusing element, the focusing elements give rise to a synthetic image when microimages are viewed through them. The geometrical structures are provided in an array of cells. The cells have a predetermined period in a first direction. The first edge of one of the at least one surface structured plate is brought to face the second edge of one of the at least one surface structured plate. The first edge thereby becomes positioned in a close proximity of the second edge. The first direction of a first area of the at least one surface structured plate adjacent to the first edge is positioned with a predetermined angle relative to the first direction of a second area of the at least one surface structured plate adjacent to the second edge. The first surface of the first area and the first surface of the second area are directed in a same direction and positioned in a same plane. A relative translation in said same plane between the first edge and the second edge is adapted for bringing a first cell border in the first area to a predetermined distance relative a corresponding second cell border in the second area. The first edge and the second edge are mutually fixated and the at least one surface structured plate is mounted onto a cylindrical support surface.

In a second aspect, a tool for production of synthetic image devices comprises at least one surface structured plate with edges attached to each other by at least one fixation seam. The synthetic image device to be produced is a synthetic integral image device or a moiré magnifier image device. A first surface of the tool has geometrical structures. The geometrical structures correspond to microimages or focusing elements to be transferred onto the synthetic image device. In case of microimages, the microimages give rise to a synthetic image when they are viewed through an array of focusing elements. In case of focusing elements, the focusing elements give rise to a synthetic image when microimages are viewed through them. The first surface of the tool at one side of the at least one fixation seam is positioned in a same cylindrical plane as the first surface of the tool at an opposite side of the at least one fixation seam. The geometrical structures are provided in an array of cells. The cells have a predetermined period in a first direction in said same cylindrical plane. The first direction at one side of the at least one fixation seam has a predetermined angle relative to the first direction at an opposite side of the at least one fixation seam with respect to said same cylindrical plane. A distance between a first cell border at one side of a fixation seam and a corresponding second cell border, which is provided at an opposite side of the fixation seam, is equal to a predetermined distance.

One advantage with the present invention is that the artefacts in a synthetic image device produced by a continuous production method are reduced to a very low level. This low artefact level makes the synthetic image device suitable to be used as starting material in further continuous manufacturing processes.

This type of high precision control is very useful in order to achieve an absolute alignment in the final product in a continuous production. Absolute alignment can be achieved by controlling the position of e.g. lenses and micro image portions during one revolution after the other, both in x and y direction (i.e. parallel and perpendicular to the revolution direction). Such a control system typically needs a registry system and an individual rotation control of the different tools as a complement to perfect tools. (However, such a control system falls outside the scope of the present invention.) Without tools having a very precise registry of its features, such controlling becomes almost impossible to perform in reality. Note also that in practise, two tools are typically used, and preferably both tools are produced according to the above presented ideas. If an object tool is perfect, it is not of very large benefit if the corresponding lens tool isn't.

This type of possibility for absolute alignment is not restricted to manufacturing of image devices or optical products, but may also be implemented for production of various products involving a manufacturing step where features of two surfaces are manufactured and aligned to each other.

BRIEF DESCRIPTION OF THE DRAWINGS

The invention, together with further objects and advantages thereof, may best be understood by making reference to the following description taken together with the accompanying drawings, in which:

FIGS. 9A-B illustrate one embodiment to adapt relative translation;

FIG. 10 illustrates a flow diagram of steps of an embodiment of an adaptation step;

DETAILED DESCRIPTION

Throughout the drawings, the same reference numbers are used for similar or corresponding elements.

The prior art approaches for reducing the visual effect of a fixated, e.g. welded, joint has been directed to the width and the smoothness of the weld seam. By utilizing such state of the art methods, the actual joint at the tool can be made very narrow and relatively smooth. Joints of less than 30 µm width and less than 5 µm depth can be produced with well adjusted production conditions. The results of the contact between the joint and the produced device will typically be a very narrow and weak structure, if even noticeable at all.

In synthetic image device, not only the macroscopic shape in the immediate area of the joint is of importance. Also the relative position of the microimages on each side of the fixated joint will be of importance. In the joint itself, the geometrical structures of the tool will of course be destroyed and corresponding micro image parts at the optical device will not give rise to any final integral image all. However, since the joint can be made very narrow, such a lack of image will almost not be possible to notice at all.

Another effect that instead will be noticeable is if the optical behaviour of the final device will differ between the different sides of the joint. For instance, if an integral image is designed to move when the incident angle of view is changed, such a motion will typically disappear when the image reaches the position of the joint. Such interruption of the optical behaviour of the final product will be far more annoying than the actual size and appearance of the joint itself. The main efforts of the present invention are therefore directed to the relative positioning of the micro structures close to the two edges that are to be mutually fixated, e.g. welded together, to form a manufacturing tool. The purpose of the relative positioning is to obtain an image of the final synthetic image device that is essentially continuous over the joint. As long as the optical effect over the joint is non-changing, the influence of the actual joint where the part image is absent is low. The joint can even be allowed to be somewhat wider, for the purpose of providing a continuous optical effect over the joint.

Figure 1A:
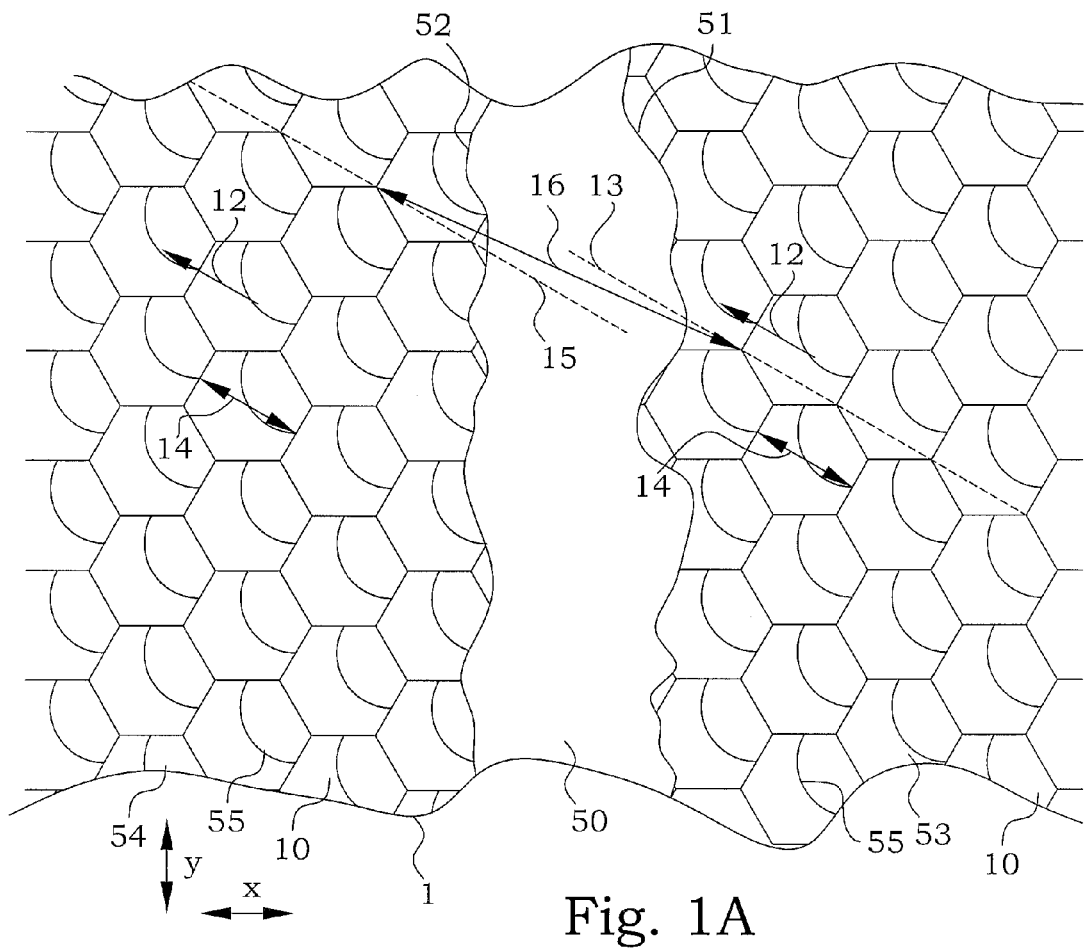
FIG. 1A is a weld seam region of an example of a cylinder for production of synthetic image devices without registry between the sides.

FIG. 1A illustrates an enlarged portion of a region around a weld seam in a cylinder 1 for production of synthetic image devices. The same principles are valid for other types of seams as well, and the weld seam should only be considered as a non-limiting example. Other non-limiting examples of fixation seams that can be used for production of synthetic image devices are e.g. adhesive seams or seams produced by attachment to a common rigid connection. The cylinder 1 is used for printing or embossing microimages onto/into a material forming the synthetic image device. The portion of the cylinder 1 has a first edge 51 of a first part 53 and a second edge 52 of a second part 54 welded together, thereby giving rise to a weld seam 50 zone. Both the first part 53 and the second part 54 present geometrical structures 55 that are intended to give rise to micro image portions on the synthetic image device to be manufactured. In the present embodiment, the geometrical structures 55 are comprised in respective cells 10.

The geometrical structures 55 can in different embodiments be positive geometrical structures, i.e. structures protruding outside the main surface, negative geometrical structures, i.e. structures forming recesses in the main surface, or combinations thereof. Any type of geometrical structure 55 or geometrical structure combination can be used in any of the detailed embodiments presented in the present disclosure.

In the embodiment of FIG. 1A, the cells are provided in a regular, repetitive pattern, which means that the cells have a predetermined period 14 in a repetition direction 12. The repetition direction 12 as well as the predetermined period 14 are thus the same at both sides of the weld seam 50 zone. In the actual weld seam 50 zone, there are no such repetitive structures. The cells 10 are typically virtual cells, i.e. the cell boundaries are not visible in the tool.

The structures 55 are either microimages or focusing elements, depending on which side of the synthetic image device the tool is intended to produce. If the structures are microimages, the microimages give rise to a synthetic image when being viewed through a perfect array of matched focusing elements. If the structures are focusing elements, the perfect array of matched focusing elements gives rise to a synthetic image when microimages are viewed through them.

A dotted line 13 is illustrated, connecting corresponding parts of cell borders of cells in the first part 53. Similarly, a dotted line 15 is illustrated, connecting corresponding parts of cell borders of cells in the second part 54. These lines are thus both parallel to the repetition direction 12 and therefore parallel to each other. Furthermore, an arrow 16 between corresponding parts of the cells on each side of the weld seam 50 zone is drawn. This arrow 16, in the example of FIG. 1A, is not parallel to the repetition direction 12. This is a result of the discrepancy between the dotted lines 13 and 15, since the arrow 16 goes between points at the two lines. The length of the arrow 16 is furthermore not an integer multiple of the period 14. In other words, the cells on each side of the weld seam zone are not in registry with each other.

A synthetic image device manufactured by such a tool will therefore not present the same integral or synthetic image on the different sides of the part of the synthetic image device that has been in contact with the weld seam 50 zone. A flip or abrupt change of the image properties at such a part will therefore occur if it is matched with a perfect array of focussing elements.

Figure 1C:
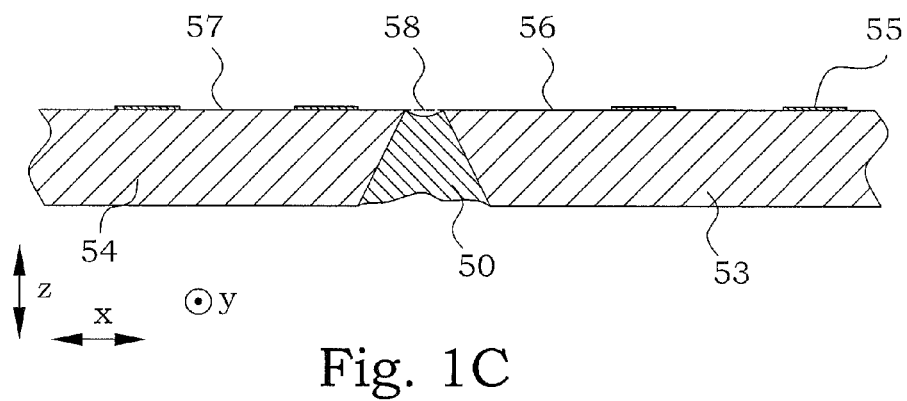
FIG. 1C is a cross-section of a weld seam region of an embodiment of a cylinder for production of synthetic image devices.
Figure 1B:
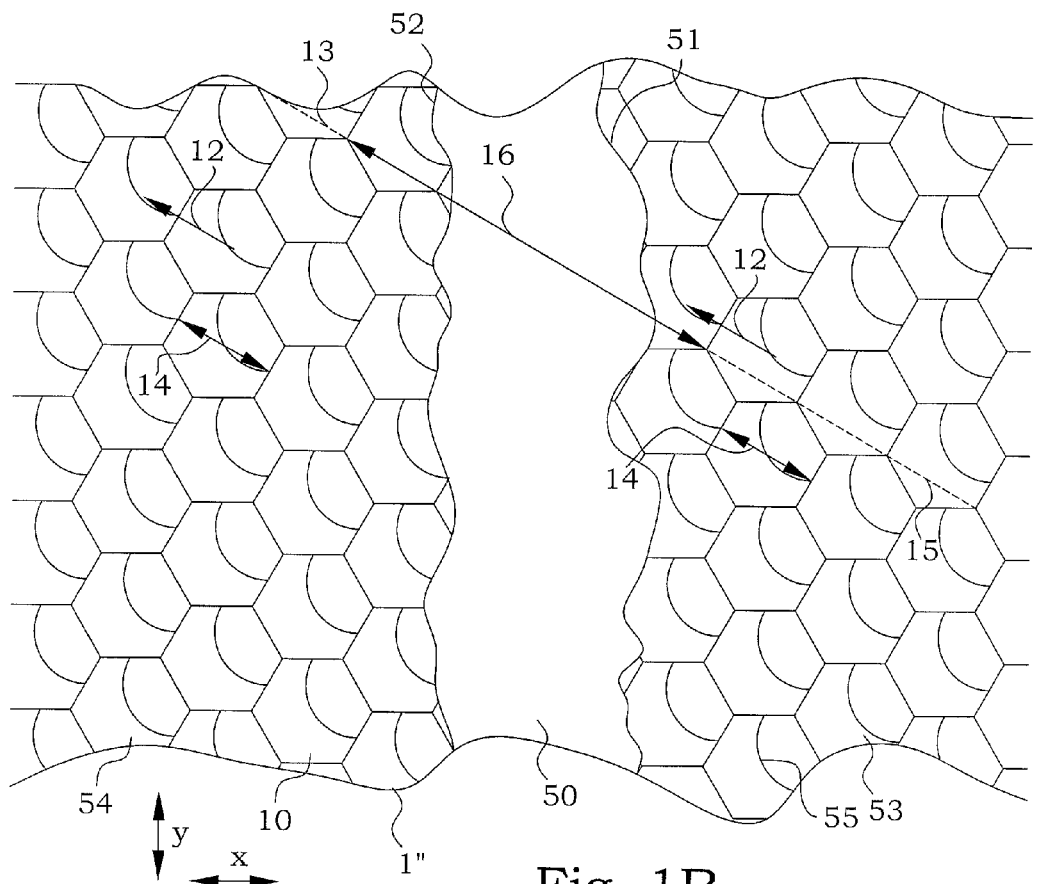
FIG. 1B is a weld seam region of an embodiment of a cylinder for production of synthetic image devices with registry between the sides.

In FIG. 1B, an enlarged portion of a region around a weld seam in another cylinder 1" for production of synthetic image devices is illustrated. Here the relative positions of the first edge 51 of the first part 53 and the second edge 52 of the second part 54 have been adapted to get the two dotted lines 13 and 15 to coincide. This also means that the arrow 16 in this embodiment has a direction parallel to the repetition direction 12. Furthermore, the distance between the first part 53 and the second part 54 is also adapted to give the arrow 16 a length being equal to an integer times the predetermined period 14. In a synthetic image device manufactured by a cylinder according to FIG. 1B, there will still be a narrow part, corresponding to the weld seam 50 zone, that will not provide any part images. However, the images provided at each side of that part will be in registry with each other. When e.g. tilting the image device, the image properties on each side of the part corresponding to the weld seam 50 zone will present the same type of properties. The missing part images that should have been present within the part corresponding to the weld seam zone will therefore only be noticed as if there would be some left out image or cover on top of the synthetic image device. There is still an experience of being able to look below such cover. If the weld seam 50 zone furthermore is made extremely narrow, such missing parts will hardly be noticed at all, as long as the registry between the patterns on each side is arranged for.

It is thus seen that an adaptation of the relative positions of the first part 53 and the second part 54 in the x-direction (as given in the figure) and in the y-direction (as given in the figure) can wipe out almost all artefacts from the part of the synthetic image device being in contact with the weld seam 50 zone.

Also, in preferred embodiments, the registry in the direction perpendicular to the surface of the cylinder 1 is of importance. FIG. 1C illustrates the weld seam zone in a cross-sectional view. Here it can be seen that a surface 56, in which the structures 55 are provided, of the first part 53 is positioned in a same plane 58 as a surface 57, in which the structures 55 are provided, of the second part 54. Such a plane 58 can be a flat plane if the first 53 and second 54 parts are held against a flat support. In a cylinder tool, the common plane 58 becomes a cylindrical plane. However, there should be no step in the z direction when moving from one side to the other. Moreover, the surfaces 56 and 57 are directed in a same direction, at least if the curvature of the cylindrical plane is disregarded, if applicable.

As a summary, the adjusting of the relative positions of the first part 53 and the second part 54 in connection with the joint, e.g. the welding, is preferably performed in all three directions, x, y and z (as defined in FIG. 1C). An relative rotation adjustment is preferably performed when the edges are put in vicinity of each other. If any remaining rotation adjustment is needed, an adjustment in the x direction can be performed, where the adjustment differs along the joint. This will give rise to a relative rotation of the two parts. In other words, a cylinder for production of synthetic image devices, either a synthetic integral image device or a moiré magnifier image device, comprises at least one surface structured plate with edges attached to each other by at least one fixation seam. An outer surface of the cylinder has geometrical structures. These geometrical structures correspond to microimages or focusing elements to be transferred onto a synthetic image device. The outer surface of the cylinder at one side of the fixation seam is positioned in a same cylindrical plane as the outer surface of the cylinder at an opposite side of the fixation seam. The geometrical structures re provided in an array of cells. The cells have a predetermined period in a first direction in the same cylindrical plane. The first direction at one side of the fixation seam is parallel to the first direction at an opposite side of the fixation seam with respect to the same cylindrical plane. Furthermore, a distance between a first cell border at one side of a weld seam and a corresponding second cell border, which is provided at an opposite side of the fixation seam along the first direction, is equal to an integer times the predetermined period.

Figure 2:
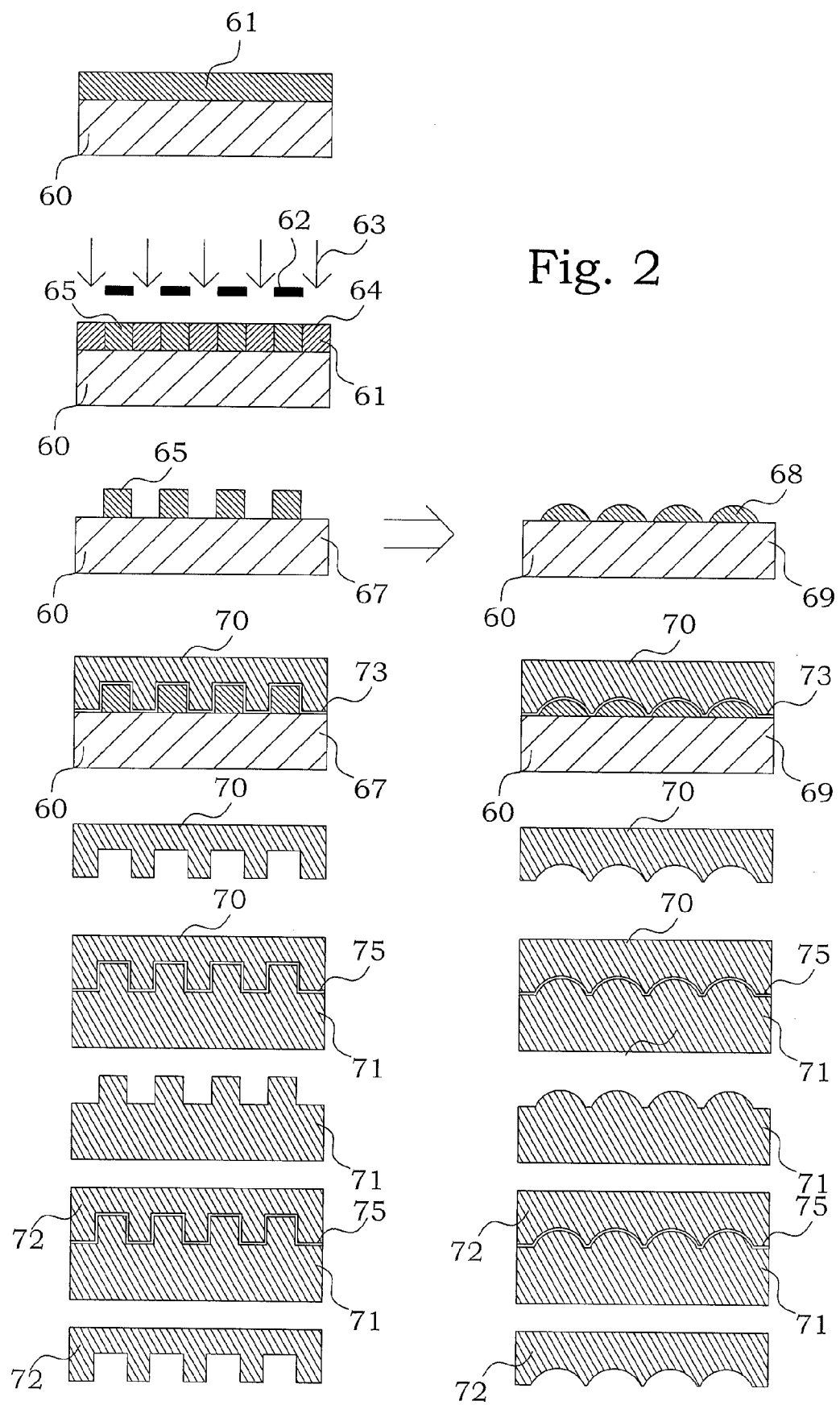
FIG. 2 is a schematic illustration of an example of a production method for a plate with structured surface.

When manufacturing a tool for production of synthetic image devices according to the ideas in the present disclosure, the starting point is a surface structured plate. This surface structured plate can be manufactured according to different prior art methods. The detailed manner in which the surface structured plate is provided is not of primary significance for the present ideas, as long as the surface structured plate has the properties presented here further below. However, as one possible example of how such a surface structured plate could be provided, an overview of one such method is briefly described here below in connection with FIG. 2.

A substrate 60, e.g. a glass plate, is covered by a photoresist 61 by ordinary spinning methods. A photo mask 62 is placed above the photoresist 61 and the device is irradiated by ultraviolet light 63. Areas 64 exposed to the irradiation undergo a chemical alteration which makes the photoresist in these areas possible to remove by solving procedures. Only areas 65 covered by the mask 62 remain. A master 67 of the structures is thereby provided.

There are many alternative approaches for manufacturing a master plate and the above presented approach should only be considered as one possible example.

In case the surface structured plate is intended to produce microlenses, the typical manner to proceed is to heat the substrate 60 until the remaining photoresist 65 melts. Due to surface tension, essentially spherical volumes 68 are formed, giving a lens master 69.

A first generation plate can now be produced by depositing, by any suitable depositing method, a seed layer 73 of e.g. Ag on top of the master 67 or 69. This depositing, e.g. sputtering, is then followed by an electroplating process with Ni, forming a first generation replication plate 70 with surface structures. The first generation replication plate 70 is removed from the master 67 or 69. These surface structures are negative structures compared to the ones intended for the final synthetic image device.

Such a first generation replication plate 70 could be utilized as said surface structured plate in the present manufacturing method. However, in a typical process, back-up copies are typically required and further generations of replication plates are therefore typically used. In the present example, to this end, the first generation replication plate 70 is in turn oxidized giving rise to an oxide layer 75, followed by electroplating with Ni. A second generation replication plate 71 is thereby produced, which is removed from the first generation replication plate 70. This second generation replication plate 71 could also be utilized as said surface structured plate, if the original structures were originally provided in a negative fashion, i.e. having recesses where protrusions are to be present in the final product and vice versa. In this example, however, the second generation replication plate 71 is also used as a back-up copy. The process therefore continues with another oxidizing of the surface, providing an oxide layer 75 onto the second generation replication plate 71 followed by a Ni electroplating, giving a third generation replication plate 72, which subsequently is removed from the second generation replication plate 71. In this example, the third generation replication plate 72 is used as said surface structured plate.

Since the previous generations of replication plates still are intact, more identical copies of the third generation replication plate 72 can be provided, either to be used together, as described further below, or as back-up copies.

Figure 3A:
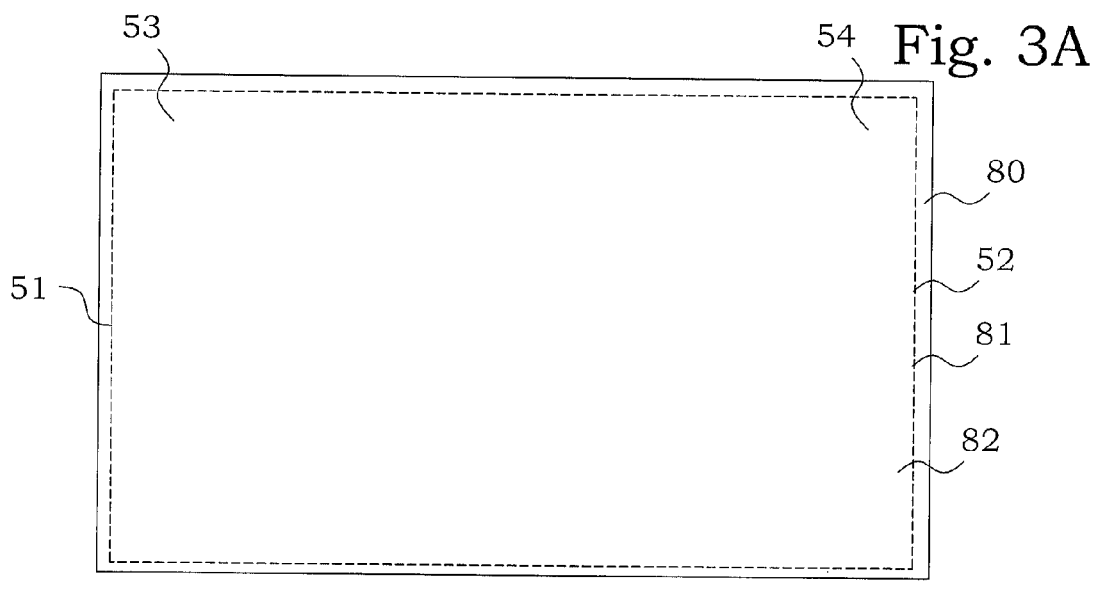
FIGS. 3A-D are illustrations of an embodiment of producing a cylinder for production of synthetic image devices.

A surface structured plate is provided, e.g. according to the principles given above. However, the details of how the surface structures plate is provided are not of crucial importance for achieving the technical effects of the ideas presented here below. The surface structures are typically provided at an inner area of the plate. The areas close to the edges are either deliberately free from structures or the structures are otherwise typically distorted, influenced by the presence of the edge. The first action to take is therefore typically to cut the surface structured plate in a suitable size. This is illustrated in FIG. 3A, where an original surface structured plate 80 is cut along the dotted lines 81, giving rise to a cut-out surface structured plate 82. At least the edges which later are going to be welded are cut. This cut is preferably made so that the geometrical structures participating in forming the image reach essentially the entire way out to the edges. The preferred position of the cut can in a preferred embodiment be marked by predefined structures provided in the surface structure plate 80 itself. The cutting can be performed e.g. by using mechanical cutting tools, by water cutting or by laser cutting. By utilizing high precision cutting procedures, the overall size can be decided with in a few μm and the approximate position of the edge relative to the geometrical structures can also be selected e.g. by the above mentioned pre-defined structures. On a macroscopic level, the edges are smooth. However, in a microscopic view, the edges still comprise an unevenness.

Figure 3B:
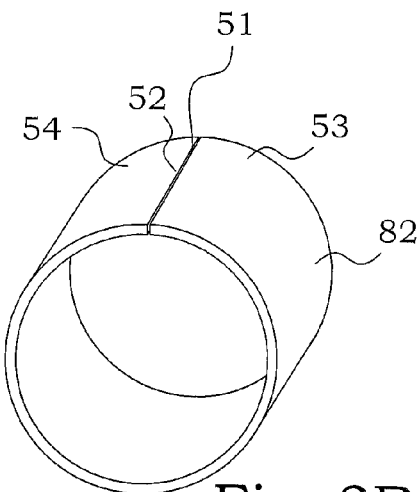

In a particular embodiment, described by the FIGS. 3A-D, the next action is to bend the cut-out surface structured plate 82 into an essentially cylindrical shape, as illustrated in FIG. 3B. A first edge 51 of a first part 53 of the cut-out surface structured plate 82 is brought into a close relationship with a second edge 52 of a second part 54 of the cut-out surface structured plate 82. In other words, the first edge 51 of the surface structured plate 82 is brought to face the second edge 52 of the surface structured plate 82 in such a way that the first edge 51 is positioned in a close proximity of the second edge 52. In this embodiment, the first edge 51 and the second edge 52 are thus edges of the same cut-out surface structured plate 82. The first edge 51 and the second edge 52 are preferably cut out parallel to each other, and after the bending in to the cylindrical shape, the edges are again positioned parallel to each other. By doing so, the relative directions of the geometrical structures at the surface of the surface structured plate are preserved. In other words, the repetition direction of a first area of the surface structured plate adjacent to the first edge is positioned parallel to the first direction of a second area of the at least one surface structured plate adjacent to the second edge. The structured surfaces of the areas on each side of the abutting edges are of course directed in a same direction.

The surfaces are also positioned in a same plane. In the present embodiment, the common plane for the bent surface structured late is a cylindrical plane and the surfaces having the structures are therefore provided in a same cylindrical plane.

In a typical case, the edges can be arranged parallel to each other and with the surface in a same plane by utilizing the parallel cutting of the edges. If the cuts are parallel, and the edges are placed in an abutting relationship on e.g. a flat or cylindrically shaped substrate surface, such positioning will typically be achieved automatically. If the direction perpendicular to the main surface is denoted the z-direction, the aligning in the z direction as well as the rotational aligning are thus easily obtainable.

The aligning in the x- and y-directions is, however, not obvious. The x-direction is in the present disclosure intended to be the direction perpendicular to the cut out edges, whereas the y direction is essentially parallel to the edges. Even if high-precision cutting of today has a high degree of accuracy, there will anyway be a remaining roughness of the edge, and the exact position of the cut will also have a certain degree of accuracy. The abutting of the edges against each other will only approximately give an aligning in the x- and y-directions. In order to get a perfect match across the fixation seam to be, the relative positions have to be adapted in the x- and y-directions. Such an adaptation of a relative translation in the common plane of the plate edges should be performed such that a first cell border in the first area is brought to a distance in the repetition direction relative a corresponding second cell border in the second area. The distance is adapted to be equal to an integer times the predetermined period of the cells. In other words, the connection line between two corresponding parts of two cells on each side of the fixation seam to be is made to be parallel to the repetition direction within each side. Furthermore, the distance between corresponding parts of the cell over the weld seam to be should be a multiple of the repetition distance for the cell on each side of the fixation seam.

Figure 3C:
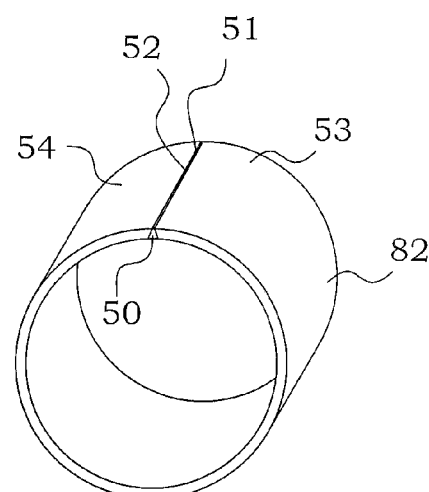
Figure 3D:
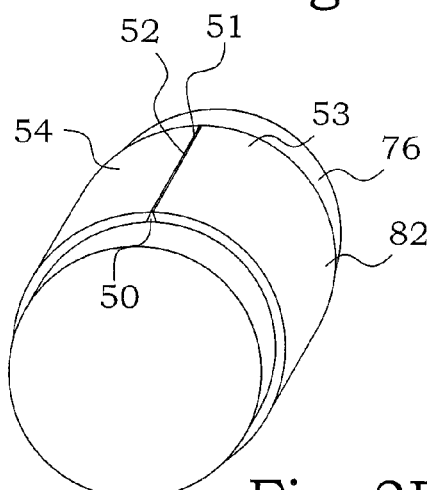

When this position has been found, the first edge and the second edge are mutually fixated, in this particular embodiment welded together, thus forming a cylindrical plate, as illustrated in FIG. 3C. Finally, the cylindrical plate is mounted onto a cylindrical support surface, in this embodiment a surface of a roller 76, as illustrated in FIG. 3D.

Figure 4A:
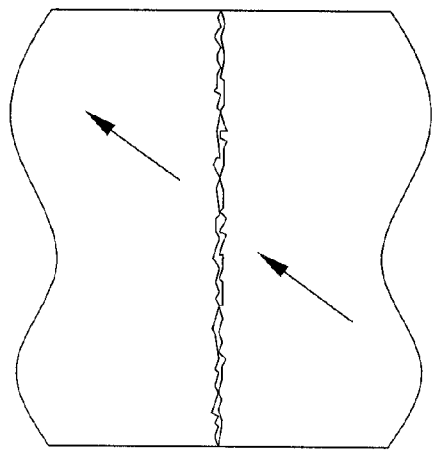
FIGS. 4A-C illustrate different approaches of adapting a relative translation between a first and second edge.
Figure 4B:
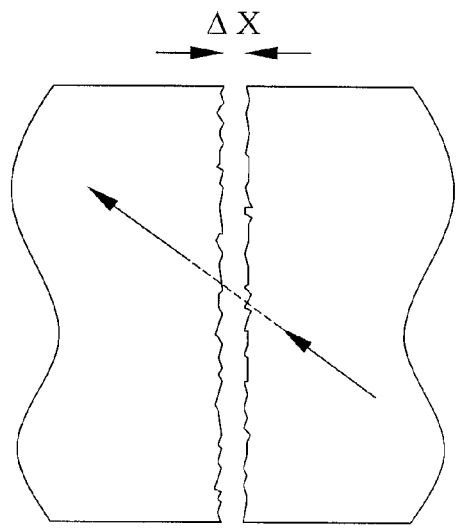
Figure 4C:
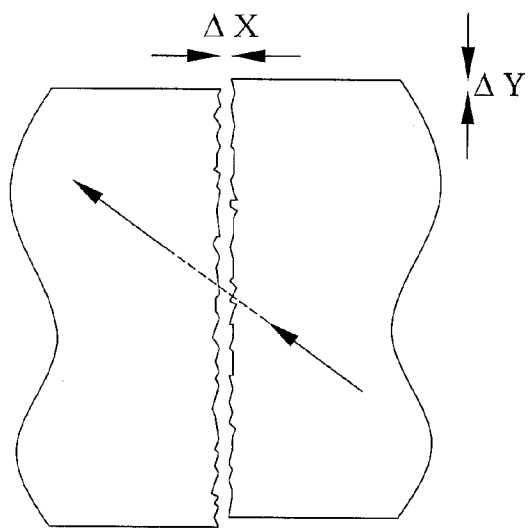

The process of aligning can also be illustrated by FIGS. 4A-C. In FIG. 4A, the two edges 51, 52 have been positioned abutted to each other. The roughness (which is exaggerated in the figure) of the edges makes the positioning in at least the x-direction somewhat inaccurate. However, the relative rotation as well as the aligning in the plane of the paper can be achieved relatively easy. In FIG. 4B, the edges have been separated from each by a distance Δx in order to align the cells on each side of the fixation seam to be. In FIG. 4C, in an alternative way, the alignment is instead achieved by using a translation in both the x-direction and the y-direction, with respective amounts Δx and Δy.

In a typical embodiment, the cutting of the surface structured plate is performed to achieve the surface structured plate in a parallelogram shape. Each cut-out plate thus presents a respective first edge and a respective second edge parallel to each other, and furthermore a respective third edge and a respective fourth edge, also parallel to each other. The aligning approach according to FIG. 4B then corresponds to that the adapting comprises aligning of the third edge adjacent to the first edge with the third edge adjacent to the second edge. Furthermore, the adapting also comprises adjusting of a distance between the first edge and the second edge in a direction parallel to the third edge for bringing the first cell border at the first end to the distance in the first direction relative the corresponding second cell border.

The embodiment of FIG. 4C then analogously corresponds to that the adapting is performed in a direction parallel to the third edge as well as a direction perpendicular to the third edge.

Figure 5:
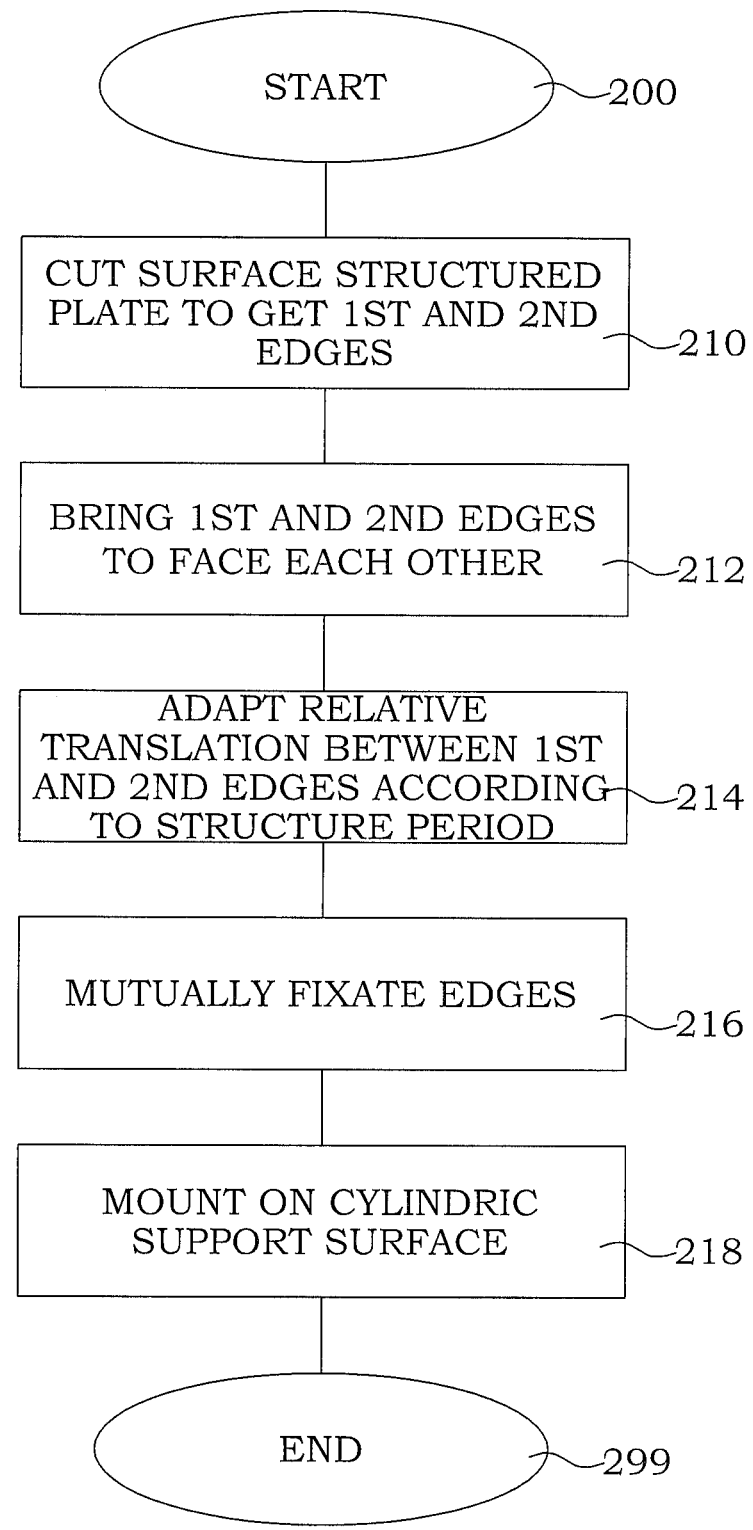
FIG. 5 is a flow diagram of steps of an embodiment of a production method of a cylinder used for production of synthetic image devices.

FIG. 5 illustrates a flow diagram of steps of an embodiment of a method for manufacturing of a tool for production of synthetic image devices. The process starts in step 200. In step 210, at least one surface structured plate is cut, giving a respective first edge and a respective second edge. The surface structured plate or each of the surface structured plates has/have geometrical structures in a first surface. The geometrical structures correspond to microimages or focusing elements to be transferred onto an image device. The image device is a synthetic integral image device or a moiré magnifier image device. In the case of microimages, the microimages give rise to a synthetic image when being viewed through an array of focusing elements. In the case of focusing elements, the focusing elements give rise to a synthetic image when microimages are viewed through them.

The geometrical structures are provided in an array of cells. The cells have a predetermined period in a first direction.

In step 212, the first edge of the surface structured plate or one of the surface structured plates is brought to face the second edge of one of the surface structured plate or another one of the surface structured plates. The first edge is positioned in a close proximity of the second edge. The first direction of a first area of the surface structured plate adjacent to the first edge is positioned, in this embodiment parallel, relative to the first direction of a second area of the surface structured plate adjacent to the second edge. The first surface of the first area and the first surface of the second area are thus in this embodiment directed in a same direction and positioned in a same plane. In step 214 a relative translation in said same plane between the first edge and the second edge is adapted for bringing a first cell border in the first area to a distance in the first direction relative a corresponding second cell border in the second area. The distance is equal to an integer times the predetermined period. In step 216, the first edge and the second edge are mutually fixated. The fixated surface structured plate or plates are mounted onto a cylindrical support surface in step 218. The process ends in step 299.

Figures 6A, 6B:
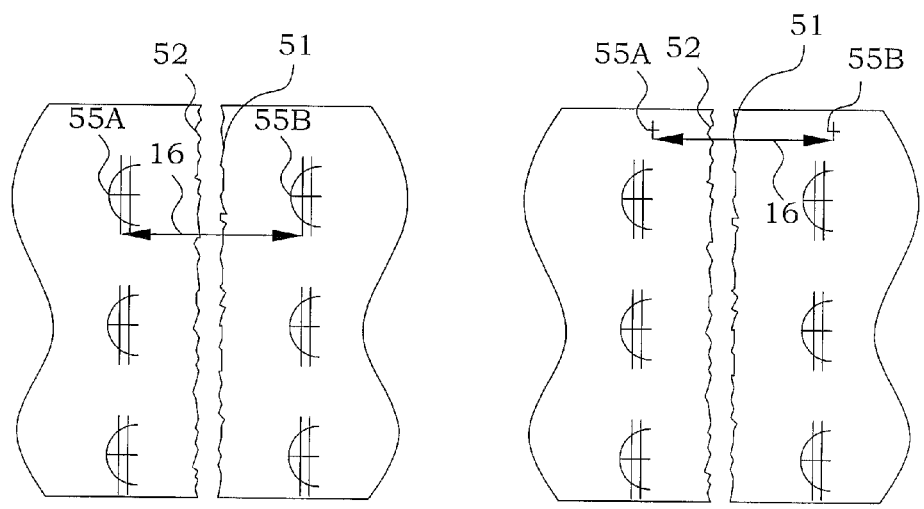
FIGS. 6A-B illustrate different structures to be used for adapting purposes.

In one embodiment of the step of adapting the relative translation between the first and second edges, the geometrical structures themselves are utilized. This is illustrated in FIG. 6A. Geometrical structures 55A and 55B of the surface structured plate in the vicinity of the first edge and the second edge, respectively, are monitored. An ideal relative position 16 of these geometrical structures 55A and 55B is known and the adapting is performed in dependence of that monitoring to bring the geometrical structures 55A and 55B into the preknown spatial relationship. In the embodiment of FIG. 6A, the geometrical structures 55A and 55B are structures within the cells themselves.

In an alternative embodiment, illustrated in FIG. 6B, the geometrical structures 55A and 55B may be registration geometrical structures provided outside the cells. These geometrical structures 55A and 55B are preferably provided for the sake of adapting this very distance. The preferred distance in x and y direction between these registration geometrical structures are then known from the design of the original pattern. The step of monitoring geometrical structures of the surface structured plate then comprises monitoring of the registration geometrical structures.

In one embodiment of the adapting of the relative translation between the first and second edges, an array of lenses is utilized. The monitoring of geometrical structures mentioned above starts in the present embodiment by position a foil of an array of lenses over the first edge and second edge, i.e. over the zone in which the fixation seam is to be created. The array of lenses has a same symmetry and pitch as the array of cells and the lenses have a focal length that is approximately equal to a thickness of the foil. This lens array will give rise to a synthetic image based on the structures in the surface structured plate. This is schematically illustrated in FIG. 9A, where a lens foil 101 is placed on top of the surface structured plate covering both the first edge 51 and the second edge 52.

If there is a mismatch over the surface structured plate joint, the synthetic image will show a discontinuity at the joint position. This can be seen in FIG. 9A. In the left part of the figure, the lenses create an enlarged image of a small portion at the geometrical structures 55, illustrated by the bunch of light rays 102. At the right part of the figure, the lenses instead pick an area outside the geometrical structures to enlarge, illustrated by the bunch of light rays 103.

In FIG. 9B, the first edge 51 and the second edge 52 are moved relative to each other in such a manner that the lenses at both sides of the fixation seam to be provided image similar portions of the geometrical structures. The synthetic image seen by a viewer will not present any discontinuity over the joint. Possibly, there might in some cases be some lenses imaging the joint itself. However, such lenses will only be experienced as "missing" image points in the overall synthetic image.

FIG. 10 is a flow diagram of steps of an embodiment of a part method for achieving an adaptation of a relative translation between edges of a surface structured plate. This part method may be utilised as step 214 in FIG. 5. In step 213, a foil comprising an array of lenses is positioned on top of the first edge and the second edge. The array of lenses has a same symmetry and as the array of cells and a pitch that is at least very close to the pitch of the array of cells. The lenses further have a focal length that is approximately equal to a thickness of the foil. In step 215, the relative translation is adapted until a synthetic image created by the array of lenses becomes continuous over the first edge and the second edge.

The structures used for this adaptation are advantageously the structures that eventually will be present in the final optical device, i.e. the geometrical structures within the actual cells. In case of the lens array plate, the surface structures are themselves a lens array. The lens array put on top of the surface structures preferably has a pitch that differs by a small amount compared to the lens array plate pitch. The image seen by a viewer will then be an enlarged image of lens, and can advantageously be used for adapting purposes.

In alternative embodiments, the structures that are imaged through the lens array film may also be structures provided at the surface structured plate for the purpose of aligning or adaptation. This is in analogy with the previously presented alternatives.

One part of the present disclosure presents the idea to adjust the edges to be mutually fixed in translational directions (x, y, z) as well as in relative rotation so as to achieve an image that is essentially continuous in its properties over the joint. In the embodiments presented above, the structures on one side of the joint are adjusted to be in registry with the structures on the other side of the joint. This obviously provides a continuous image over the joint. In the method, the predetermined angle is zero, wherein the first direction of a first area of the surface structured plate adjacent to the first edge is parallel to the first direction of a second area the surface structured plate adjacent to the second edge. Furthermore, the predetermined distance relative a corresponding second cell border in the second area is in the first direction equal to an integer times the predetermined period. In other words, in a tool, the predetermined angle is zero, wherein the first direction at one side of the fixation seam is parallel to the first direction at an opposite side of the fixation seam with respect to the same cylindrical plane. Furthermore, the predetermined distance is, in the first direction, equal to an integer times the predetermined period.

However, there are also other possibilities to provide a continuous image over a joint. For instance, if the array of focusing elements is misaligned over the joint either by a relative rotation or by a distance between similar parts of the cells that is not equal to an integer of the regular cell distance or both, the actual focusing element array becomes discontinuous across the joint. However, a continuous image can anyway be produced if the array of microimages is given the very same discontinuity.

In a general case, the step of bringing the first edge of the surface structured plate to face the second edge of the surface structured plate comprises positioning of the first direction of a first area of the surface structured plate adjacent to the first edge with a predetermined angle relative to the first direction of a second area of the surface structured plate adjacent to the second edge. This predetermined angle will together with a corresponding angle of the microimages or focus elements, provided at the opposite side of the intended image device have the potential to produce a continuous image over the joint. Similarly, the step of adapting a relative translation in the same plane between the first edge and the second edge is performed for bringing a first cell border in the first area to a predetermined distance relative a corresponding second cell border in the second area. This predetermined distance will together with a corresponding distance of the microimages or focus elements, provided at the opposite side of the intended image device have the potential to produce a continuous image over the joint.

Figure 12:
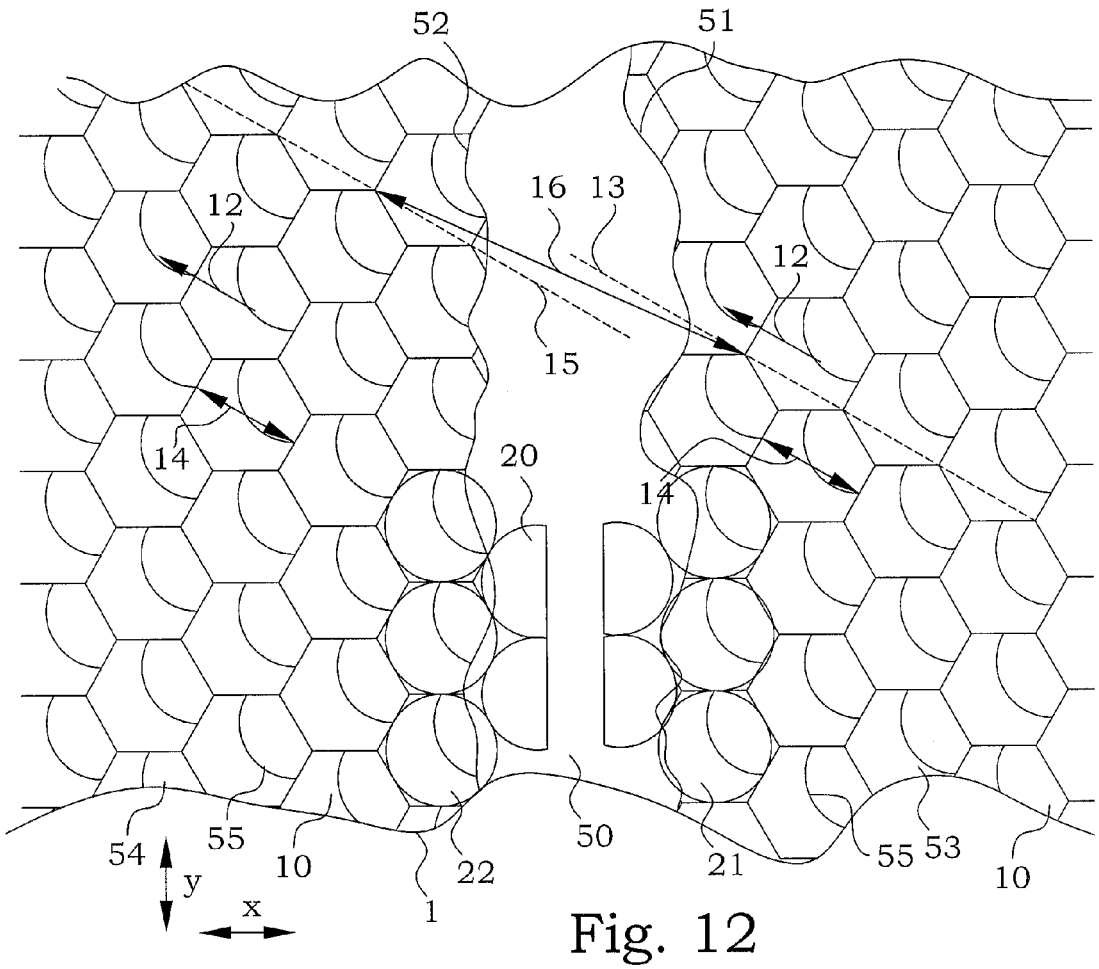
FIG. 12 illustrates a weld seam region of an example of a cylinder for production of synthetic image devices without registry between the sides, but in registry with a focusing element array.

This is illustrated schematically in FIG. 12. Here a similar situation as in FIG. 1A is illustrated. By use of a regular focus element array overlaid on such structures, a discontinuity in the image will occur. However, if a focus element array with a same discontinuity in terms of angle and distance deviation over the joint is used the situation is changed. In FIG. 12, a couple of focusing elements 20 are indicated overlaid on top of the cells 10. The part array 22 to the left in the figure obviously is not in registry with the part array 21 to the right in the figure. However, both part arrays 21 and 22 are in registry with the geometrical structures 55 on each side of the fixation seam 50. This means that the focusing elements 20 will provide an enlarged view of the geometrical structures that together form a synthetic image that is continuous over the fixation seam 50. The same is also true if there is a relative rotational misalignments between the different sides.

In other words, if the geometrical structures correspond to microimages of the final image device, the arrays should be in registry with the corresponding focusing elements. Thus, the predetermined angle mentioned further above then corresponds to an angle between symmetry lines of arrays of cells of focusing elements in areas intended to be provided in registry with the microimages on either side of the first and second edges of an image device. Also, the predetermined distance relative a corresponding second cell border in the second area corresponds to a distance between cell borders of arrays of cells of focusing elements in areas intended to be provided in registry with the microimages on either side of the first and second edges of an image device.

This can also be view from the focusing element perspective. If the geometrical structures correspond to focusing elements of the final image device, the arrays should be in registry with the corresponding microimages. Thus, the predetermined angle mentioned further above then corresponds to an angle between symmetry lines of arrays of cells of microimages in areas intended to be provided in registry with the focusing elements on either side of the first and second edges of an image device. Also, the predetermined distance relative a corresponding second cell border in the second area corresponds to a distance between cell borders of arrays of cells of microimages in areas intended to be provided in registry with the focusing elements on either side of the first and second edges of an image device.

In other words, in a tool, where the geometrical structures correspond to microimages, the predetermined angle corresponds to an angle between symmetry lines of arrays of cells of focusing elements in areas intended to be provided in registry with the microimages on either side of the first and second edges an image device. Furthermore, the predetermined distance relative a corresponding second cell border in the second area corresponds to a distance between cell borders of arrays of cells of focusing elements in areas intended to be provided in registry with the microimages on either side of the first and second edges an image device. Similarly, in a tool, where the geometrical structures correspond to focusing elements, the predetermined angle corresponds to an angle between symmetry lines of arrays of cells of microimages in areas intended to be provided in registry with the focusing elements on either side of the first and second edges an image device. Furthermore, the predetermined distance relative a corresponding second cell border in the second area corresponds to a distance between cell borders of arrays of cells of microimages in areas intended to be provided in registry with the focusing elements on either side of the first and second edges an image device.

Figure 13:
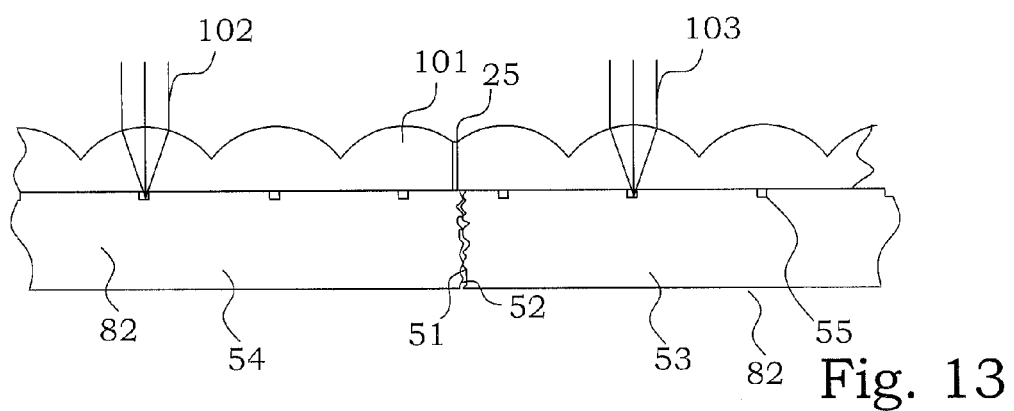
FIG. 13 illustrates one embodiment to adapt relative translation.

This approach is by advantage combined with the embodiment of using a lens array for monitoring alignment, described in connection with FIGS. 9A and 9B. If first a lens foil for the intended optical device is produced, it can be used for adapting the positions of the microimages. This lens foils can have a discontinuity in its array. In FIG. 13, the lens foil 101 with the discontinuity 25 in the lens array is placed on top of the surface structured plate. The position of the edges 51 and 52 are then adapted until the geometrical structures obtain the same discontinuity. Both light rays 102 and light rays 103 are picking up the geometrical structures, despite the existing discontinuity in the array, due to the fact that the lens foil has the same discontinuity. The situation will then by appropriate alignment between the tools providing the focusing elements and the microimages produce a final image device with a continuous image across the position of the joint.

Even if the adaptation is of great importance for the final product quality, also the cutting can be utilized for improving the accuracy of the manufacturing. Since the final cylinder typically is mounted on a roller with a certain known diameter, the perimeter of the cylinder surface when mounted will be known very accurately from this diameter and from the thickness of the cylinder plate. By assuring that a specific number of cells will be provided at such a perimeter, the distance between each cell in the final product will be well defined. This can be achieved or at least prepared directly at the cutting step. In a preferred embodiment, the cutting is performed such that it includes a predetermined integer number of cells with reference to the repetition direction between the respective first edge and the respective second edge. By then knowing the distance across the fixation seam, the total number of repetitions around the perimeter of the final tool will be well defined. The cell repetition distance will thereby be possible to control to a very high degree.

In an embodiment, where the plate is cut in a parallelogram shape, the predetermined number of cells is selected to give a ratio between a quantity $2\pi(r+t)/\cos(\alpha)$ and the predetermined integer number of cells as close as possible to an intended pitch of the microimages or focusing devices of the synthetic image device. r is a radius of the roller, t is a thickness of the surface structured plate and $\alpha$ is an angle between the repetition direction and the third edge.

In a typical manufacturing process for a synthetic image device, a cylinder is provided at a roller and a foil of material is contacted with the cylinder in different ways. In prior art, where the fixation seam is considered as an inevitable artefact, the cylinder is typically made by bending one plate, as indicated e.g. in FIG. 3B and FIG. 3C. Typical synthetic image device manufacturing procedures involves different steps of providing resins in different layers, pre-curing, application of prints or embossing, final curing etc. are provided. All such processes have to be performed at one and the same roller. Due to this, the roller has to have a certain size in order to allow for all processes to be performed. Furthermore, printing/embossing procedures typical for producing synthetic image devices are typically easier to perform if the curvature of the roller is not too large. It is thus from a printing/embossing point of view preferable to have a roller with a rather large diameter. In prior art production systems, however, such demands are difficult to fulfil, since a large roller diameter requires either a number of fixation seams or a very large area surface structured plate. A very large area surface structured plate is extremely expensive to manufacture. On the other hand, multiple fixation seams according to prior art principles were not acceptable either.

Figure 7A:
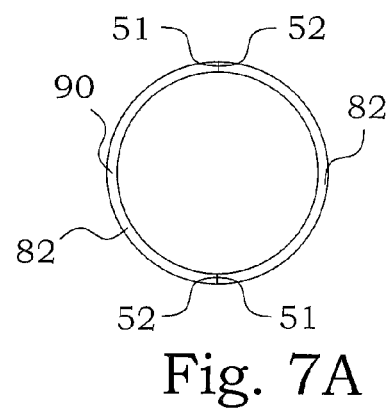
FIGS. 7A-B illustrate embodiments of printing tools comprising more than one surface structured plate.
Figure 7B:
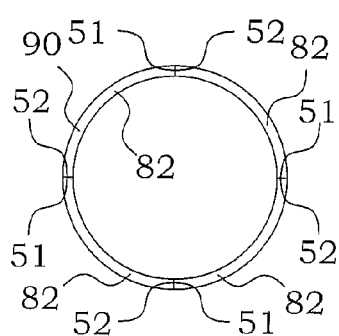

However, the present ideas, by which the impact of the fixation seam is reduced, make it practically possible to use more than one plate to form the cylinder. This is schematically illustrated in e.g. FIG. 7A, where two surface structured plates 82 are mutually fixated at two respective edges, thereby forming a common cylinder 90. Since the pattern of the structures of the plates is aligned across the fixation seams, the impact of the fixation seams on the final product is very small. These principles could of course be extended also to more than two plates. In FIG. 7B, a cylinder 90 formed by fixating four plates to each other is illustrated. In other words, the method for manufacturing a synthetic image device then generally comprises a step of providing at least one surface structured plate. In the above discussed embodiments, this step comprises the step of providing at least two surface structured plates. In these embodiments, a first edge of each of the at least two surface structured plates are brought to face a second edge of a second part of another of the at least two surface structured plates. The at least two surface structured plates together form a closed surface structured cylinder. The process steps of adapting and welding are performed on each pair of first and second edges.

Figure 7C:
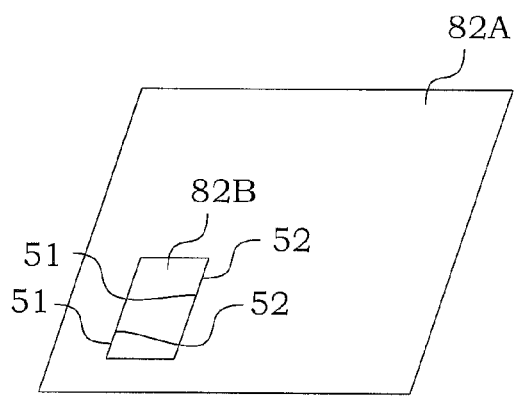
FIG. 7C illustrate an embodiment of a printing tool presenting two surface structured plates positioned within a hole.

The present ideas of making the effects of the fixation seams on the final product almost invisible also open up for other approaches. Parts of plates can be combined in different ways by cutting and fixating. One possible embodiment is schematically illustrated in FIG. 7C. A surface structured plate 82A is provided with a hole 85. The hole 85 is defined by a first edge 51 and a second edge 52 as well as edges transverse thereto. Another surface structured plate 82B is cut to fit into the hole 85. In other words, the cutting is performed by cutting a hole in a first surface structured plate, and cutting a second surface structured plate for fitting within the hole. This surface structured plate 82B also presents first and second edges 51, 52. The small surface structured plate 82B is positioned within the hole in such a way that the surface structures of the surface structured plate 82B comes into registry with the surface structures of the surface structured plate 82A. In such a relative position, the plates are mutually fixated.

The mutual fixation can be performed in different ways. The most common approach is to use welding. The welding can in a general view be performed by any welding method known in prior art. The choice of welding method should preferably be selected depending on the actual material in the plates.

In a preferred embodiment, the welding is performed by use of laser. Continuous fibre lasers as well as pulsed YAG lasers are two possible examples, of which the latter one presently is considered as the preferred.

Figure 8A:
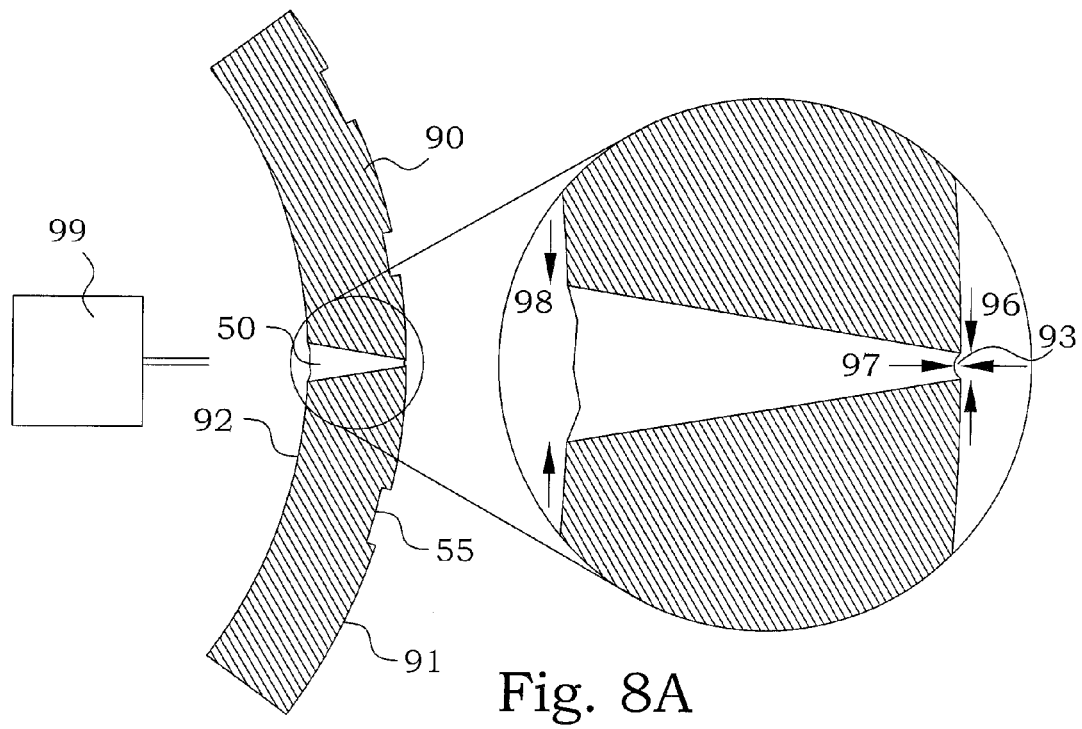
FIGS. 8A-B illustrate embodiments of a fixation seam region of a cylinder.

In a preferred embodiment, and in accordance with the ideas disclosed in the published international patent application WO 2006/056660 A1, the welding is performed from a side of a second surface of the printing plate, where the second surface is opposite to the first surface where the surface structures are provided. FIG. 8A illustrates schematically a cross-sectional view of an enlarged portion around a weld seam of a cylinder 90. The surface structures 55, in this particular embodiment recesses, are provided at an outer surface 91 of the cylinder 90. The inner surface 92 of the cylinder 90 is the surface that is going to rest against the roller during the manufacturing process. When performing a welding by a laser 99, the welded zone becomes wider at the part closest to the laser 99 and the zone is successively reduced further into the material. The actual weld seam zone is even more enlarged in the figure, and here the general wedge shape of the weld seam zone is clearly seen.

Figure 8B:
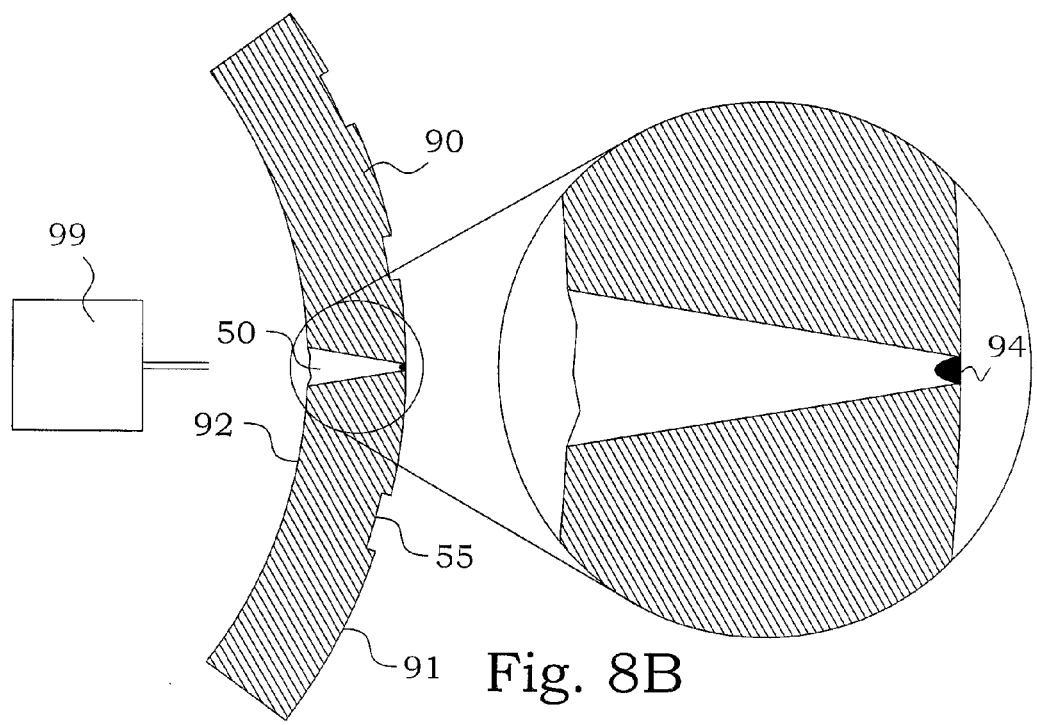

By selecting the welding parameters correctly, in dependence of e.g. the plate material, the plate thickness and the cooling conditions, it is possible to achieve weld seam zones 96 that are as small as 50 µm or even less at or close to the outer surface 91. At the entrance side, i.e. the inner surface 92, the width 98 of the weld seam is typically 200-300 µm. In order to minimize the impact of the weld seam on the final product, the weld seam should preferably not protrude outside the outer surface 91. It is then better to have a small recess 93 left at the outer surface. By carefully selecting the welding parameters, recesses 97 as small as 5 µm are possible to obtain. It is also an advantage if the remaining recess 93 at the outer surface is as smooth as possible. Different kinds of smoothening processes could therefore preferably be applied, e.g. by laser irradiation. This laser irradiation is preferably performed from the second, inner surface 92 and preferably by a continuous fibre laser. The remaining grooves or small recesses can also, in particular embodiments, be filled up with a solid material 94 and thereby reducing the impacts on the final product even further. This is schematically illustrated in FIG. 8B.

Also the properties of inner side of the weld seam zone are of importance. Since the inner surface 92 of the cylinder 90 is intended to be placed against a surface of a roller with a very tight fitting, any parts of the welded zone that protrudes outside the inner surface 92 will influence also the position of the outer surface. The weld seam should therefore preferably not protrude outside the inner surface 92 either. The smoothness of the weld seam on the inner side is however not of equal importance.

In alternative embodiments, other methods for achieving the mutual fixation can be used. In one alternative embodiment, after the steps of bringing and adapting, the mutual fixation can be performed by a number of spot welds holding the first edge and the second edge together. The spot welds are preferably performed at positions outside the cells, in order not to destroy any image information. The mutually fixed surface structured plate is then mounted to the cylindrical support surface. Here, the mutual position can be made permanent by providing e.g. adhesives between the surface structured plate and the cylindrical support surface.

In another embodiment, the first edge and the second edge can be mutually fixated by attaching the first edge and the second edge to a common rigid connection, preferably provided at the back side of the surface structured plate. This can be performed e.g. by use of adhesives. The common rigid connection thus creates a rigid joint between the first edge relative to the second edge. The mutually fixed surface structured plate is then mounted to the cylindrical support surface. If necessary, the cylindrical support surface may have a recess for receiving the common rigid connection in order not to disturb the front surface of the tool.

In yet another embodiment, the non-fixated surface structured plate or plates are first contacted to a cylindrical support surface. The cylindrical support surface can be covered by an adhesive and the adapting step could then be performed before the adhesive cures. The curing of the adhesive then constitutes the mutual fixation of the surface structured plate or plates. In this embodiment, the steps of adapting and mutually fixating the first edge and the second edge are performed after the step of mounting.

In another embodiment, the mutual fixation between the first and second edges can also be provided by mechanical means, such as screws, clamps etc. Procedures analogue to the embodiments utilizing adhesives are possible, mutatis mutandis.

In the embodiments using approaches where a full welding is not provided, a small slit is typically provided between the first and second edge. In such embodiments, the slit between the first edge and the second edge can be filled with a solid filling material. This can be performed according to similar principles as presented in FIG. 8B.

The mounting of the cylinder on a roller will influence the quality of the final product. It is preferred to have a close fitting between the cylinder and the roller. One reason is that the cylinder has to be kept in a stationary relationship with the roller, since it is the roller that is controlled, not the actual cylinder. It is therefore in applications where high forces are expected to act on the cylinder preferable to provide some types of fixation means between the cylinder and the roller. This becomes particular important to consider when an accurate match between focusing elements and micro images is requested.

The close fitting is also of importance for the final pitch of the produced synthetic image device, which in turn typically influences the experienced image depth etc. The roller can be produced by a very accurate periphery measure. When the cylinder is provided on this periphery, the outer surface of the cylinder will have a periphery measure that is dependent on the roller dimensions as well as on the thickness of the cylinder. A roller with a diameter of 200 mm will have a periphery length of 628 mm. A cylinder made of plates with a thickness of 0.5 mm adds about 3 mm to the periphery length. A cell structure may have a repetition length of some ten micrometers. This means that the total number of repetitions around the cylinder may be in the order of 20-30 000. Even if the inaccuracy of the plate thickness or the attachment to the roller is 5 µm, i.e. only 1% of the thickness, the inaccuracy in the periphery becomes in the order of 30 µm, which is in the same order of magnitude as an entire cell. From this example, it is easily understood that also the thickness of the cylinder plate has to be well controlled.

Figure 11:
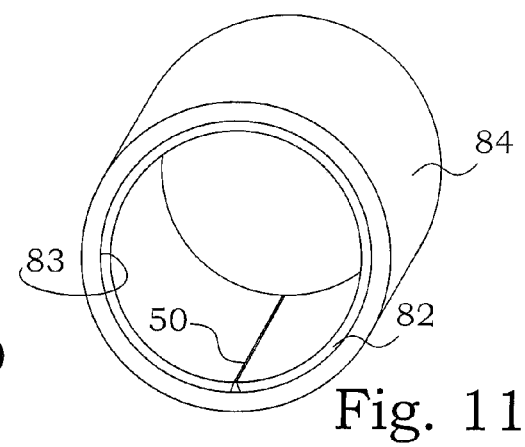
FIG. 11 illustrates an embodiment of cylindrical replication plate with an inwards facing surface structured plate.

A surface structured plate according to the above ideas can also be used as a replication plate for manufacturing of a printing plate, in turn used for manufacturing of synthetic image devices. In other words, the surface structured plate can be one of the replication plates 71 or 72 of FIG. 2. This is particularly beneficial if the printing plate is a cylindrical plate. As illustrated by FIG. 11, by mounting the surface structured plate at the inner surface 83 of a tube 84, a replication plate 85 is formed, on which a cylindrical seamless printing plate can be plated. In other words, a cylindrical replication plate 85 is provided with an inwards facing surface structured plate 82.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method for manufacturing of a tool for production of synthetic image devices, comprising:
   cutting at least one surface structured plate, giving a respective first edge and a respective second edge;
   each of said at least one surface structured plate having geometrical structures in a first surface, said geometrical structures corresponding to one of microimages and focusing elements to be transferred onto an image device, being one of a synthetic integral image device and a moire magnifier image device;
   said microimages giving rise to a synthetic image when being viewed through an array of focusing elements, said focusing elements giving rise to a synthetic image when microimages are viewed through said focusing elements;
   said geometrical structures being provided in an array of cells, said cells having a predetermined period in a first direction;
   bringing said first edge of one of said at least one surface structured plate to face said second edge of one of said at least one surface structured plate, wherein said first edge being positioned in a close proximity of said second edge, wherein said first direction of a first area of said at least one surface structured plate adjacent to said first edge being positioned with a predetermined angle relative to said first direction of a second area of said at least one surface structured plate adjacent to said second edge, and wherein said first surface of said first area and said first surface of said second area being directed in a same direction and positioned in a same plane;
   adapting a relative translation in said same plane between said first edge and said second edge for bringing a first cell border in said first area to a predetermined distance relative a corresponding second cell border in said second area;
   monitoring geometrical structures of said at least one surface structured plate in vicinity of said first edge and said second edge, wherein said step of adapting is performed in dependence of said monitoring;
   said step of monitoring geometrical structures of said at least one surface structured plate in turn comprises positioning a foil comprising an array of focusing elements on top of said first edge and said second edge, said array of focusing elements having a same symmetry as said array of cells and having a focal length being approximately equal to a thickness of said foil, giving rise to a synthetic image;
   wherein said step of adapting comprises adapting of said relative translation until said synthetic image created by said array of focusing elements becomes continuous over said first edge and said second edge;
   mutually fixating said first edge and said second edge; and
   mounting said at least one surface structured plate onto a cylindrical support surface.

2. The method according to claim 1, wherein
   said predetermined angle between said first direction of said first area of said at least one surface structured plate adjacent to said first edge and said first direction of said second area of said at least one surface structured plate adjacent to said second edge is zero, which means that said first direction of said first area of said at least one surface structured plate adjacent to said first edge being parallel to said first direction of a second area of said at least one surface structured plate adjacent to said second edge; and
   said predetermined distance relative a corresponding second cell border in said second area being in said first direction equal to an integer times said predetermined period.

3. The method according to claim 1, wherein
   said geometrical structures correspond to microimages;
   wherein said predetermined angle corresponds to an angle between symmetry lines of arrays of cells of focusing elements in areas intended to be provided in registry with said microimages on either side of said first and second edges of an image device; and
   wherein said predetermined distance relative a corresponding second cell border in said second area corresponds to a distance between cell borders of arrays of cells of focusing elements in areas intended to be provided in registry with said microimages on either side of said first and second edges of an image device.

4. The method according to claim 1, wherein
   said geometrical structures correspond to focusing elements;
   wherein said predetermined angle corresponds to an angle between symmetry lines of arrays of cells of microimages in areas intended to be provided in registry with said focusing elements on either side of said first and second edges an image device; and
   wherein said predetermined distance relative a corresponding second cell border in said second area corresponds to a distance between cellborders of arrays of cells of microimages in areas intended to be provided in registry with said focusing elements on either side of said first and second edges an image device.

5. The method for manufacturing according to claim 1, wherein said step of cutting comprises cutting said at least one surface structured plate according to pre-defined structures provided in said at least one surface structured plate.

6. The method for manufacturing according to claim 1, wherein said step of mutually fixating said first edge and said second edge comprises welding said first edge and said second edge together.

7. The method for manufacturing according to claim 1, wherein said step of mutually fixating said first edge and said second edge comprises attaching said first edge and said second edge to a common rigid connection, creating a rigid joint between said first edge relative to said second edge.

8. The method for manufacturing according to claim 1, wherein said step of cutting at least one surface structured plate comprises the step of cutting at least two surface structured plates; and said step of bringing comprises the step of bringing a first edge of each at least two surface structured plates to face a second edge of a second part of another of said at least two surface structured plates;

wherein said at least two surface structured plates together forms a closed surface structured cylinder;

wherein said step of adapting and said step of welding is performed on each pair of first and second edges.

9. The method for manufacturing according to claim 1, wherein said step of cutting at least one surface structured plate comprises the step of cutting one surface structured plate; and said step of bringing comprises the step of bringing a first edge of said one surface structured plate to face a second edge of a second part of said one surface structured plate;

wherein said one surface structured plate forms a closed surface structured cylinder.

10. The method for manufacturing according to claim 1, wherein said step of mutually fixating said first edge and said second edge is performed before said step of mounting.

11. The method for manufacturing according to claim 1, wherein said step of adapting and mutually fixating said first edge and said second edge are performed after said step of mounting.

12. The method for manufacturing according to claim 1, wherein said foil comprising an array of focusing elements positioned on top of said first edge and said second edge is a foil comprising an array of lenses.

13. The method for manufacturing according to claim 1, wherein said step of monitoring geometrical structures of said at least one surface structured plate comprises monitoring geometrical structures within said cells.

14. The method for manufacturing according to claim 12, wherein said step of monitoring geometrical structures of said at least one surface structured plate comprises monitoring geometrical structures within said cells.

15. The method for manufacturing according to claim 6, wherein said welding said first edge and said second edge together comprises spotwelding said first edge and said second edge together at positions outside said cells.

16. The method for manufacturing according to claim 15, further comprising filling a slit between said first edge and said second edge with a solid filling material.

17. The method for manufacturing according to claim 1, wherein said step of cutting at least one surface structured plate comprises cutting a hole in a first surface structured plate, and cutting a second surface structured plate for fitting within said hole, wherein said step of bringing comprises positioning said second surface structured plate into said hole.

18. The method for manufacturing according to claim 1, wherein said cylindrical support is a roller.

19. The method for manufacturing according to claim 1, wherein said cylindrical support is a tube, whereby said at least one surface structured plate is mounted against an inner surface of said tube, thereby providing a replication plate.

* * * * *